(No Model.)

C. E. HAYES.
BOLT.

No. 316,619. Patented Apr. 28, 1885.

WITNESSES:
Gustave Dieterich
Fredk. Hueswold

INVENTOR,
Carl Emil Hayes:
BY Dodge & Son,
ATTORNEYS.

United States Patent Office.

CARL EMIL HAYES, OF BROOKLYN, ASSIGNOR OF TWO-THIRDS TO CHRISTOPHER REISSNER AND CHARLES E. MEIER, OF NEW YORK, N. Y.

BOLT.

SPECIFICATION forming part of Letters Patent No. 316,619, dated April 28, 1885.

Application filed February 18, 1885. (No model.)

*To all whom it may concern:*

Be it known that I, CARL E. HAYES, of Brooklyn, in the county of Kings and State of New York, have invented certain new and useful Improvements in Packing-Bolts, of which the following is a specification.

My invention relates to bolts used for fastening together the plates or parts of steam-boilers or tanks of any kind for boiling liquids, &c.; and the invention consists in constructing the under side of the head of the bolt in such a manner as to hold and compress a packing that shall render the hole through which the bolt passes perfectly tight, so as to prevent the escape of any steam or fluid, as hereinafter more fully set forth.

Figure 1:
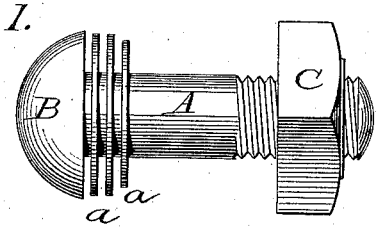
Figure 2:
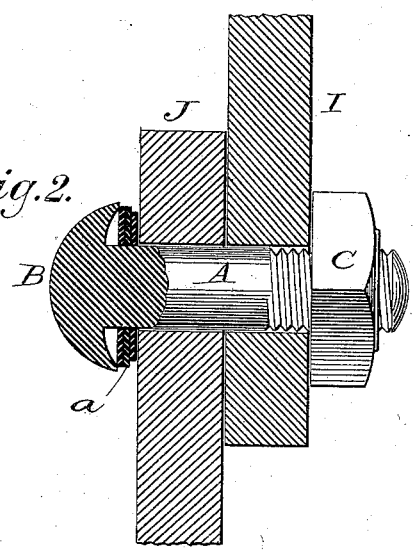
Figure 3:
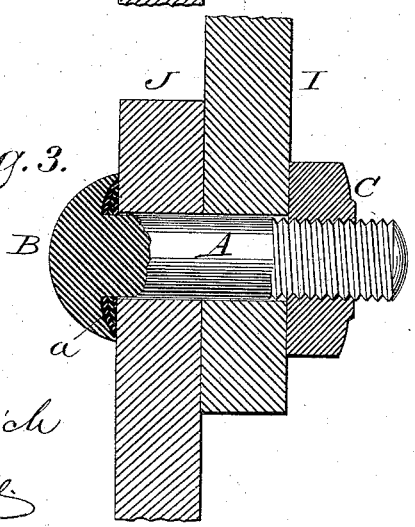

Figure 1 is a side view of the bolt and packing. Fig. 2 is a sectional view of the end of two plates with the bolt and packing in position, and Fig. 3 is a similar view showing the packing compressed, as it is in use.

The object of this invention is to provide a means for rendering the joints of steam apparatus, and tanks for holding liquids of all kinds, and especially boiling liquids, absolutely tight, so as to prevent the escape of either steam or liquid around the bolts. To accomplish this result, I construct the bolts which are to be used to fasten the plates or other parts together in such a manner that the under side or face of their heads shall be concave, as shown in Figs. 2 and 3. This may be done by forging them in a properly-shaped die, and then truing them up in a lathe or milling-machine; or they may be forged with the under face of their heads flat, and then have the concavity formed by cutting out the metal to the desired form. However formed, care should be taken to have the outer edge of the concave rim true and even all around.

Having thus prepared the bolts A, I then provide the packing, which may be of vulcanized rubber, asbestus packing, or any similar material, and which is cut in the form of washers $a$, of proper size to fit on the bolt A, as shown in Figs. 1 and 2. I prefer to use two or more thicknesses of this packing, and to make them of slightly-differing diameters, as shown in Figs. 1 and 2, the larger being slipped on first, and being slightly less in diameter than the head D of the bolt, while the washer which comes next to the plate shall be still smaller, as shown clearly in Figs. 1 and 2. The bolt, with the packing-washers on it, is then inserted through a hole in the overlapping plates I J, as shown in Fig. 2, and the nut C is then screwed up tight, thereby compressing the packing $a$ within the concavity under the bolt-head, as shown in Fig. 3. It will be seen that the concave or inclined sides of the bolt-head when thus drawn up will crowd the packing $a$ inward all around and compress it tightly against the body of the bolt A, it at the same time being forced and held tight against the plate J, and thus it will be made to pack the joint or opening in the most effectual manner, and prevent the possibility of the escape of any steam or fluid through the bolt-holes or from under the heads of the bolts.

It is customary in securing man-hole covers or other plates in steam boilers, engines, pumps, and the like, to insert a gasket or ring of rubber or other packing between the parts when bolting them together; but where the bolts project through to the inside the packing-ring, while packing the joint between the parts, does not prevent the escape of steam, &c., through the holes around the bolts, and in all such cases the use of these bolts, with their packing, will remedy the difficulty. It is applicable in all cases where boilers or tanks for boiling or holding liquids of any kind are composed in whole or in part of overlapping plates or flanges, or in any case where the bolts project through to the inside and are held in place by a nut.

It is obvious that the same principle or method of packing may be applied to the nut, if desired; but as a general rule that will not be necessary.

Having thus fully described my invention, what I claim is—

1. The bolt A, having the under face of the laterally-projecting portion of its head D made concave, to adapt it to receive, compress, and hold a packing, $a$, substantially as shown and described.

2. In combination with a bolt having the under side of its head made concave, the compressible packing $a$, applied substantially as and for the purpose set forth.

CARL EMIL HAYES.

Witnesses:
E. A. ACKER,
JULIUS KALLMUN.